United States Patent [19]
Yamakido et al.

[11] Patent Number: 4,787,080
[45] Date of Patent: Nov. 22, 1988

[54] PCM CODER AND DECODER CIRCUIT HAVING DIGITAL BALANCING NETWORK

[75] Inventors: Kazuo Yamakido, Nishitama; Takahiko Kozaki, Koganei; Shigeo Nishita, Kokubunji; Kenichi Ohwada, Yokohama, all of Japan

[73] Assignees: Hitachi Ltd.; Hitachi Micro Computer Eng. Ltd., both of Tokyo, Japan

[21] Appl. No.: 894,861

[22] Filed: Aug. 8, 1986

[30] Foreign Application Priority Data

Aug. 14, 1985 [JP] Japan .................. 60-177564

[51] Int. Cl.⁴ .................................. H04B 3/23
[52] U.S. Cl. ...................... 370/32.1; 379/410
[58] Field of Search ............ 379/410, 407, 411; 370/32, 32.1; 333/18, 28; 364/724

[56] References Cited

U.S. PATENT DOCUMENTS

| 4,072,830 | 2/1978 | Gitlin et al. | 370/32.1 X |
| 4,377,793 | 3/1983 | Horna | 379/411 X |
| 4,480,156 | 10/1984 | Takahashi et al. | 379/411 |
| 4,527,020 | 7/1985 | Ito | 370/32.1 X |
| 4,577,309 | 3/1986 | Barazeche et al. | 370/32.1 X |
| 4,672,665 | 6/1987 | Nagai et al. | 379/410 X |
| 4,731,834 | 3/1988 | Duttweiler et al. | 379/410 |

FOREIGN PATENT DOCUMENTS 0122594 10/1984 European Pat. Off. ............ 379/406

OTHER PUBLICATIONS

"Results of Experiments with a Digital Hybrid in Two-Wire Digital Subscriber Loops", B. Aschrafi et al., NTG-Fachber (Germany), vol. 73, pp. 21-25, 1980.

Primary Examiner—Jin F. Ng
Assistant Examiner—Randall S. Vaas
Attorney, Agent, or Firm—Antonelli, Terry & Wands

[57] ABSTRACT

A PCM coder and decoder circuit for use in a subscriber line interface circuit of a telephone communication system has a digital balancing network for removing any echo signal. The digital balancing network is formed by series-connecting a first balancing circuit having characteristics corresponding to the fixed characteristics of a coder, decoder, etc. and a second balancing circuit having characteristics corresponding to variable characteristics of an external circuit including two-wire transmission line which is connected to the coder and decoder circuit. Thus, a replica of an echo signal is precisely produced, and the circuit configuration is simplified.

3 Claims, 2 Drawing Sheets

PCM CODER AND DECODER CIRCUIT HAVING DIGITAL BALANCING NETWORK

BACKGROUND OF THE INVENTION (1) Field of the Invention

The present invention relates to a PCM coder and decoder circuit having a digital balancing network. More particularly, the present invention pertains to a PCM coder and decoder circuit, such as that provided in a subscriber line interface circuit of a telephone switching system, which has a coder adapted to convert an analogue signal applied through a two-wire to four-wire converter into a digital signal, a decoder adapted to decode the digital signal into an analogue signal and apply this analogue signal to the two-wire to four-wire converter, and a balancing network adapted to remove any echo signal which is produced by a portion of the output of the decoder which undesirably enters the coder through the two wire-four wire converter.

(2) Description of the Prior Art

To suppress the echo signal produced through the two-wire to four-wire converter, it is conventional practice to employ a circuit having characteristics collectively approximated to the amplitude and phase-frequency characteristics of all the devices included in the echo path, such as an A/D converter, a D/A converter, etc., in addition to the two-wire to four-wire converter, as shown in, for example, The Bell System Technical Journal, Vol. 50, pp.785 to 813 (March 1971). Accordingy, the circuit configuration is complicated, and the size of the circuit is increased, which means that it is difficult to realize excellent echo suppression characteristics economically. Moreover, it is not easy to change the adequate characteristics when the external conditions from the PCM encoder and decoder, and two-wire load impedances will be changed.

SUMMARY OF THE INVENTION

It is a primary object of the present invention to provide a PCM coder and decoder circuit (CODEC) having a digital balancing network which is so designed that the circuit configuration of the digital balancing network is simplified and it is possible to obtain excellent echo supresion characteristics.

To this end, the present invention provides a PCM coder and decoder circuit having a digital balancing network comprising first and second balancing circuits cascade-connected to each other, the first balancing circuit being adapted to correct the characteristics of a portion of the echo signal path which corresponds to an A/D converter, a D/A converter, etc. which constitute the PCM coder and decoder circuit, and the second balancing circuit having characteristics corresponding to those of a portion of the echo signal path which includes a two wire-four wire converter from the output terminal of the D/A converter to the input terminal of the A/D converter. The characterstics of the second balancing circuit essentially need to be variable, whereas the characteristics of the first balancing circuit need not be variable due to the fact that the PCM coder and decoder circuit is an important device for constructing a switching and transmission system; therefore, once it has been developed and designed the circuit configuration and characteristics thereof are not changed easily. For this reason, the first balancing circuit may be constituted by a filter circuit whose characteristics approximated to inpulse response are fixed, thereby simplying the hardware arrangement.

DETAIL DESCRIPTION OF PREFERRED EMBODIMENT

Figure 1:
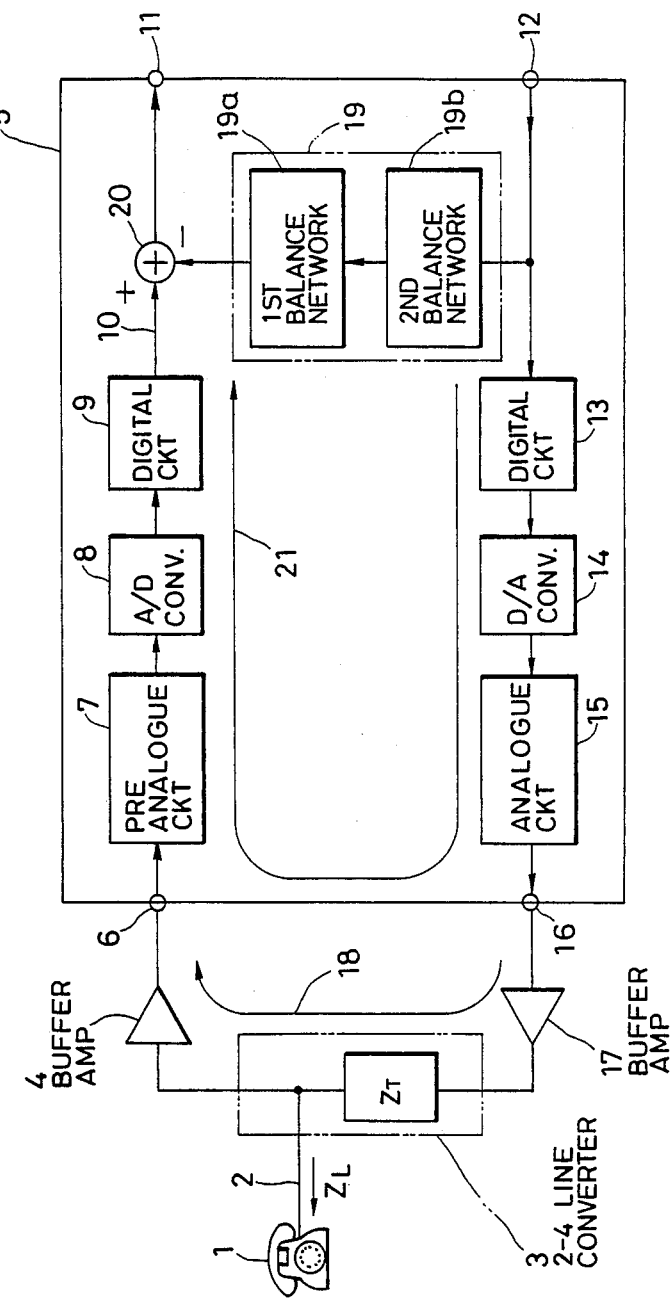
FIG. 1 is a block diagram showing the arrangement of one embodiment of the PCM coder and decoder circuit according to the present invention.

FIG. 1 shows one embodiment of the PCM coder and decoder circuit having a digital balancing network according to the present invention.

The transmission signal from a telephone set 1 is supplied to an analogue transmission input terminal 6 of a PCM coder and decoder circuit 5 through a two-wire transmission line (line impedance $Z_L$) 2, a two-wire to four-wire converter (terminal impedance $Z_T$) 3 shown by an equivalent circuit, and a buffer amplifier 4. This analogue transmission input signal is passed through a pre-analogue circuit 7 including an anti-aliasing filter to remove sampling folded noise, and supplied to an A/D converter 8 where it is converted into a digital signal. The digital signal thus obtained is supplied to a digital circuit 9 where it is subjected to conversion of sampling frequency and code format so that the digital signal can be conveniently subjected to various digital signal processings carried out later. Thereafter, the digital signal is output from a terminal 11 as a four-wire digital transmission signal.

On the reception side, the four-wire digital reception signal which is input from a terminal 12 is supplied to a digital circuit 13 where it is subjected to conversion of sampling frequency and code format so that they are convenient for the circuit configuration of a D/A converter 14 in the subsequent stage and realization of required characteristics. The analogue signal thus obtained is passed through a post-analogue circuit 15 including a low pass filter to remove sampling noise and then output from an analogue reception output terminal 6. This analogue output signal is supplied to the telephone set 1 through the buffer amplifier 17, the two-wire to four-wire converter 3 and the two-wire transmission line 2.

At this time, a portion of the analogue reception signal may undesirably enter the transmission side through the two wire-four wire converter 3 to produce an echo signal 18. This echo signal 18 is added to the transmission signal from the telephone set 1 and converted into a digital signal again. However, the digital echo signal which is output to the digital transmission output terminal 11 can be suppressed by adding a replica of the echo signal produced by a balancing network 19 to the echo signal in an adder 20 so that the echo signal is cancelled.

In the above-described arrangement of the PCM coder and decoder circuit, the digital balancing network 19 constitutes an essential part of the present invention, and the other portions are equivalent to those conventionally known.

According to the present invention, the balancing network 19 is constituted by two separate portions. More specifically, the balancing network 19 is, as shown in FIG. 1, realized by cascade-connecting first and second balancing circuits 19a and 19b, the first balancing circuit 19a being adapted to approximate the characteristics of only a circuit portion which is generally defined as the internal function of the PCM coder and decoder circuit, that is, the A/D converter, the D/A converter, etc., and the second balancing circuit 19b being adapted to approximate the characteristics of only the circuit which is provided outside the PCM coder and decoder circuit, that is, the circuit connected between the input terminal 6 of the A/D converter and the output terminal 16 of the D/A converter.

More specifically, if the transfer functions of the transmission side (from the input terminal 6 to the output terminal 11) in the PCM coder and decoder circuit 5, the reception side (from the input terminal 12 to the output terminal 16) and the external circuit including the two-wire to four-wire converter 3 are represented by $H(Z)_{TX}$, $H(Z)_{RV}$ and $H(Z)_{EX}$, respectively, the transfer function $H(Z)BN$ of the balancing network 19 is given by the following equation:

$$H(Z)_{BN} = H(Z)_{RV} \cdot H(Z)_{EX} \cdot H(Z)_{TX} \ldots \quad (1)$$

Therefore, the first balancing circuit 19a is arranged such as to have a transfer function $H(Z)_{BN1}$ which is given by the following equation:

$$H(Z)_{BN1} = H(Z)_{RV} \cdot H(Z)_{TX} \ldots \quad (2)$$

On the other hand, the second balancing circuit 19b is arranged such as to have a transfer function H(Z)BN2 which is given by the following equation:

$$H(Z)_{BN2} = H(Z)_{EX} = \frac{abZ_L(Z)}{Z_T(Z) + Z_L(Z)} \quad (3)$$

In the above-described equations, H(Z) and Z(Z) are z-transform representation, while a and b are voltage amplification factors of the external buffer amplifiers 4 and 17, respectively.

As will be understood from the equation (2), the transfer function $H(Z)_{BN1}$ of the first balancing circuit 19a corresponds to an echo signal 21 obtained by shorting the terminals 16 and 6 in the arrangement shown in FIG. 1. The first balancing circuit 19a having such characteristics can be realized employing a relatively simple circuit because of the fact that once the PCM coder and decoder circuit 5 has been designed so that it has performance sufficient to form a telephone switching system, the characteristics thereof need not be variable. For example, an oversampling linear interpolative A/D converter is employed as the A/D converter, while an over-sampling linear interpolative D/A converter is employed as the D/A converter, and inpulse signals of 0, 1, 0, 0, 0, 0, 0, . . . are input to the digital reception signal terminal 12. In such case, if 0, 0, 1/32, ½, 29/64, 1/64, 0, . . . are obtained, the equation(2) may be expressed as follows:

$$H(Z)_{BN1} = \frac{1}{32} Z^{-1} + \frac{1}{2} Z^{-2} + \frac{29}{64} Z^{-3} + \frac{1}{64} Z^{-4} \quad (4)$$

Figure 2:
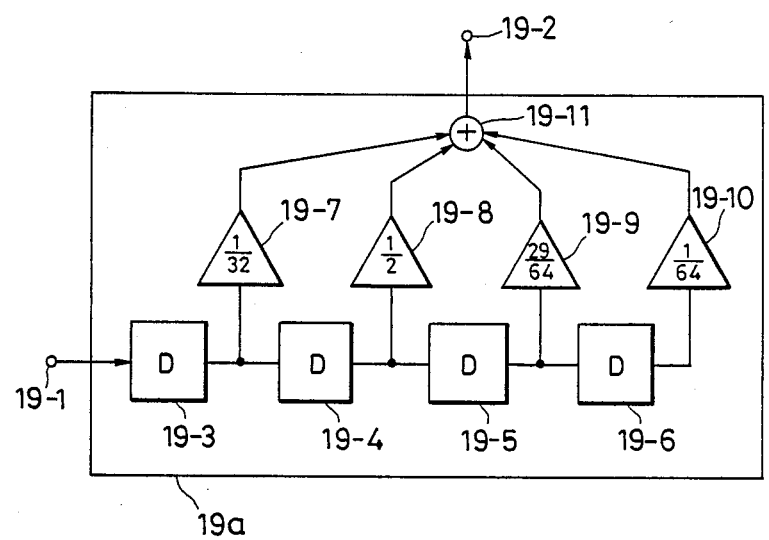
FIG. 2 illustrates a practical example of the first balancing circuit shown in FIG. 1.

Accordingly, the first balancing circuit 19a having the characteristics represented by the equation (4) can be realized by arranging it as shown in FIG. 2. In FIG. 2: the reference numeral 19-1 denotes an input terminal for a signal supplied from the second balancing circuit 19b; 19-2, an output terminal; 19-3 to 19-6, delay circuits; 19-7 to 19-10, multiplier circuits; and 19-11, an adder circuit.

Figure 3:
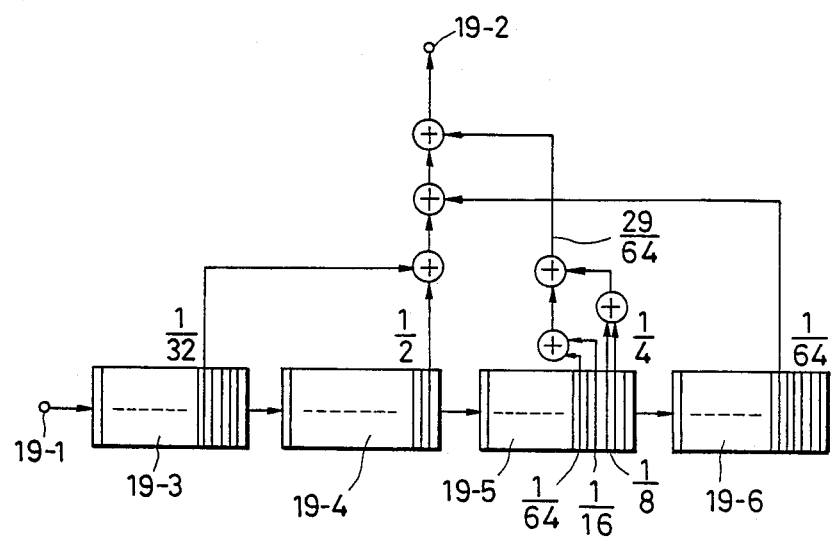
FIG. 3 illustrates a second practical example of the first balancing circuit.

FIG. 3 shows another example of the first balancing circuit 19a having the characteristics represented by the equation(4) in which the circuit 19a is realized by executing serial calculation without employing any multiplier circuit. The reference numerals 19-3 to 9-6 denote delay circuits, similar to those shown in FIG. 2, which are constituted by shift registers.

It should be noted that the characteristics of the second balancing circuit 19b must be variable in accordance with the impedance $Z_L$ of the two-wire transmission line which changes depending upon the kind and length of the line, as shown in the equation (3).

What is claimed is:

1. In a PCM coder and decoder circuit having a D/A converter adapted to convert an input PCM signal into an analogue signal, and A/D converter adapted to convert an input analogue signal into a PCM signal, and a digital balancing network provided between the input terminal of said D/A converter and the output terminal of said A/D converter, the improvement which comprises:

said digital balancing network being formed by cascade-connecting first and second balancing circuits, said first balancing circuit having predetermined non-variable characteristics approximated to transfer characteristics viewed from said digital balancing network toward said D/A converter and said A/D converter when the output terminal of said D/A converter and the input terminal of said A/D converter are shorted, and said second balancing circuit having characteristics approximated to the characteristics of a signal which is produced when a circuit having an impedance component is connected between the output terminal of said D/A converter and the input terminal of said A/D converter by a portion of the output of said D/A converter which undesirably enters said A/D converter through said circuit having an impedance component.

2. A PCM coder and decoder circuit having a digital balancing network according to claim 1, wherein said circuit having an impedance component is either a two-wire to four-wire converter provided outside said PCM coder and decoder circuit or a circuit which includes said two-wire to four-wire converter.

3. A PCM coder and decoder circuit having a digital balancing network according to claim 1, wherein said digital balancing network is formed on a semiconductor integrated circuit together with said A/D converter and said D/A converter in one unit.

* * * * *